(12) United States Patent
Boylan

(10) Patent No.: US 6,739,802 B2
(45) Date of Patent: May 25, 2004

(54) FISH TEST CIRCUIT AND METHOD FOR EVALUATION OF WATERWAY BARRIER FISH BYPASS SYSTEMS

(75) Inventor: Delmer Boylan, Bruneau, ID (US)

(73) Assignee: BGA Limited Partnership, Boise, ID (US)

( * ) Notice: Subject to any disclaimer, the term of this patent is extended or adjusted under 35 U.S.C. 154(b) by 0 days.

(21) Appl. No.: 10/195,085

(22) Filed: Jul. 11, 2002

(65) Prior Publication Data

US 2004/0009040 A1 Jan. 15, 2004

(51) Int. Cl.[7] ................................................. E02B 8/08
(52) U.S. Cl. ............................ 405/83; 405/81; 119/200
(58) Field of Search ............................. 405/52, 81, 82, 405/83; 119/219, 220, 200; 73/61.41

(56) References Cited

U.S. PATENT DOCUMENTS 2,683,969 A * 7/1954 Mugnier
4,437,431 A * 3/1984 Koch
4,532,038 A * 7/1985 Reid .......................... 210/194
6,394,699 B1 * 5/2002 Neufeld

FOREIGN PATENT DOCUMENTS

GB  1533848  * 11/1978

* cited by examiner

*Primary Examiner*—Jong-Suk James Lee
(74) *Attorney, Agent, or Firm*—Pedersen & Co., PLLC; Ken J. Pedersen; Barbara S. Pedersen

(57) ABSTRACT

A fish test circuit for the evaluation of waterway barrier bypass systems with a conduit having at least one bypass system test station, water flow within the conduit, fish introduced into the conduit, and measurement of the effectiveness of the bypass system under test. In the preferred embodiment of this invention, the measurement of the effectiveness of the bypass system under test includes determining the survival or mortality rate of the fish as they pass through each bypass system undergoing test. The test circuit may be a closed loop or a side channel of another waterway. An important benefit and feature of this invention is the capability to evaluate multiple and differing bypass systems under similar water flow, water conditions and water quality conditions.

20 Claims, 2 Drawing Sheets

FISH TEST CIRCUIT AND METHOD FOR EVALUATION OF WATERWAY BARRIER FISH BYPASS SYSTEMS

BACKGROUND OF THE INVENTION

1. Field of the Invention

This invention relates to upstream and downstream passage of migratory fish, and more particularly to the determination of the efficacy of dam bypass methods and apparatus.

2. Related Art

As briefly reviewed hereinafter, there is considerable prior art addressing methods and apparatus to facilitate and enhance the passage of migratory fish past manmade waterway barriers, i.e. dams. What has been lacking heretofore are methods and apparatus to adequately test, evaluate and compare the performance of such fish passage systems under known and controlled conditions. The invention disclosed herein fills this long standing need.

Many methods for improving the passage of fish past man-made barriers have been proposed and are in use. Two common methods include fish ladders and barging the fish from one side of a dam to the other. Other systems include Zimmerman (U.S. Pat. No. 4,629,361) who discloses an integrated bypass fishway comprised of tubes which enable fish to swim on a near natural level with the original streambed without ladders, locks, etc. Zimmerman includes devices which attempt to mimic some of the natural aspects of the original stream.

I have invented a method and apparatus for the passage of fish to the sea (U.S. Pat. No. 5,161,913) which includes the creation of water flow within a main conduit and in one or more collection tubes flowing into the main conduit from spawning areas. Lighting within the conduit is provided to attract and guide the fish toward the downstream side of a dam. The fish are preferably siphoned over the dam.

Eikrem et al. (U.S. Pat. No. 6,273,639) teaches a more complex conduit fish bypass passage system that involves a plurality of valves and valve actuators disposed in series within the conduit. The valves form chambers in the conduit which upon their selective opening and closing urge the fish through the conduit.

With varying degrees of success, many other methods and devices have been conceived and put into use that are designed to allow the free passage of migratory fish past waterway barriers. However, the art is silent with respect to methods and equipment that are suitable for a comparative evaluation of such fish bypass systems under controlled and identical conditions.

Thus it is an object of the present invention to provide methods and apparatus that permit the comparative evaluation of waterway barrier fish bypass systems. It is a further object of this invention to provide such an apparatus and methods that permit the simultaneous evaluation under similar environmental conditions of the multiple bypass systems undergoing evaluation. It is still another object of this invention to provide such apparatus and methods that provide a quantitative determination of each test system's effectiveness. It is yet another object of this invention to provide a system that is safe to its operators, the migratory fish and the environment. It is a final object of this invention to provide an evaluation system that is inexpensive to fabricate and operate.

SUMMARY OF THE INVENTION

This invention of a fish test circuit for the evaluation of waterway barrier bypass systems preferably comprises a closed loop conduit having at least one bypass system test station, a means for providing water flow within the conduit, a means for introducing fish into the conduit, and a means for measuring the effectiveness of the bypass system(s) under test. In the preferred embodiment of this invention, the means for measuring the effectiveness of the bypass system(s) under test includes a means for determining the survival or mortality rate of the fish as they pass through each bypass system undergoing test. An important feature and benefit of this invention is the capability to evaluate multiple and differing bypass systems under similar water flow, water condition and water quality conditions.

In addition, the fish test circuit of this invention may also include known means for controlling the environmental conditions and quality of the water within the conduit. Alternative embodiments of this invention may also include known methods and apparatus for illuminating conduit sections and viewing the fish within the conduit.

These and many other features and attendant advantages of the invention will become apparent as the invention becomes better understood by reference to the following detailed descriptions and accompanying drawings.

DESCRIPTION OF THE PREFERRED EMBODIMENTS

Figure 1:
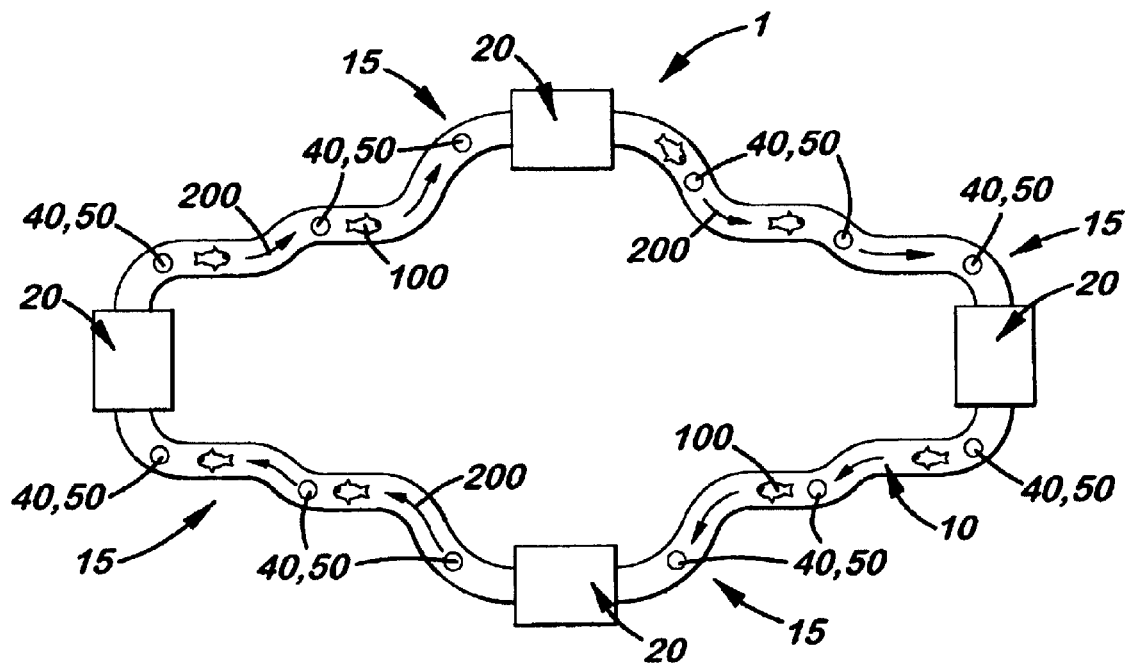
FIG. 1 is a schematic representation of one embodiment of the fish test circuit of this invention.

With reference to FIG. 1, fish test circuit 1 for the evaluation of waterway barrier fish bypass systems comprises closed loop conduit 10 having at least one bypass system test station 20. The invention also includes a means for providing water flow within the conduit, a means for introducing fish into said conduit, and a means for measuring the effectiveness of the fish bypass system(s) under test. Each of these means is well known to those skilled in this art and for clarity purposes are not shown in detail in FIG. 1. By way of example, FIG. 1 depicts the downstream passage of fish 100, i.e. clockwise flow of water 200.

Water flow, of course, may be initiated and maintained by pumps, especially for a test circuit without any grade. Also, air jets or mechanical paddles, for example, may also be used to push or pull the water in one direction around the circuit. Preferably, the water in the test circuit may be urged first in one direction, i.e., clockwise, and second in the opposite direction, i.e., counterclockwise.

Means for introducing the fish may be dumping from buckets or nets, or pipeline from hatching or tanker truck or adjacent waterway.

The means for measuring the effectiveness of the bypass system(s) under test includes the determination of the viability of fish 100 in the test loop both before and after exiting each bypass system. This is accomplished by known fish counting methods and equipment, for example visual or electronic counting of fish. Also, physical examination of introduced and surviving fish may assist as a measure of the effectiveness of the bypass system(s) under test.

In the preferred embodiment, any of several known means is also provided for controlling the environmental conditions and quality of the water within the test loop. For example, water temperature, flow rate, turbidity, etc., may be monitored and controlled. Also, a particular test may include a partial trip around the circuit, or several or many trips around the circuit.

Figure 2:
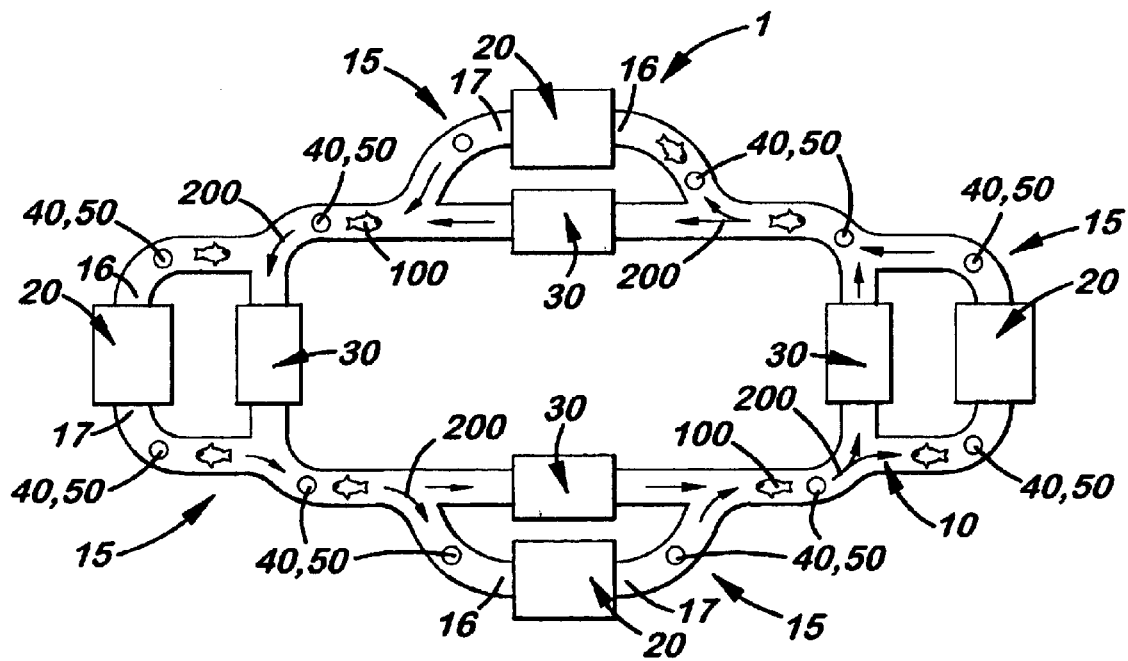
FIG. 2 is a schematic representation of alternative embodiments of this invention.

Referring now to FIG. 2, in an acceptable alternative embodiment, conduit 10 may be comprised of a plurality of sections 15, each section including a means for illuminating 40 the section. Such illumination may be used to urge and control the desired transit of the fish through the test loop conduit and the bypass system under test. The water flow 200 in FIG. 2 represents the upstream passage of fish 100. It is also acceptable, as shown in FIG. 2, to incorporate water barriers 30 to simulate waterway dams, obstacles, constrictions, etc.

Continuing reference to FIG. 2, it is also desirable to provide known means for viewing 50 the fish within the test loop. Conduit sections 20 have upstream end 16 and downstream end 17 and a means for viewing fish included between these ends. The viewing capability along with the illumination means will facilitate the monitoring and counting of fish and the determination of acceptable water conditions and quality.

Figure 3:
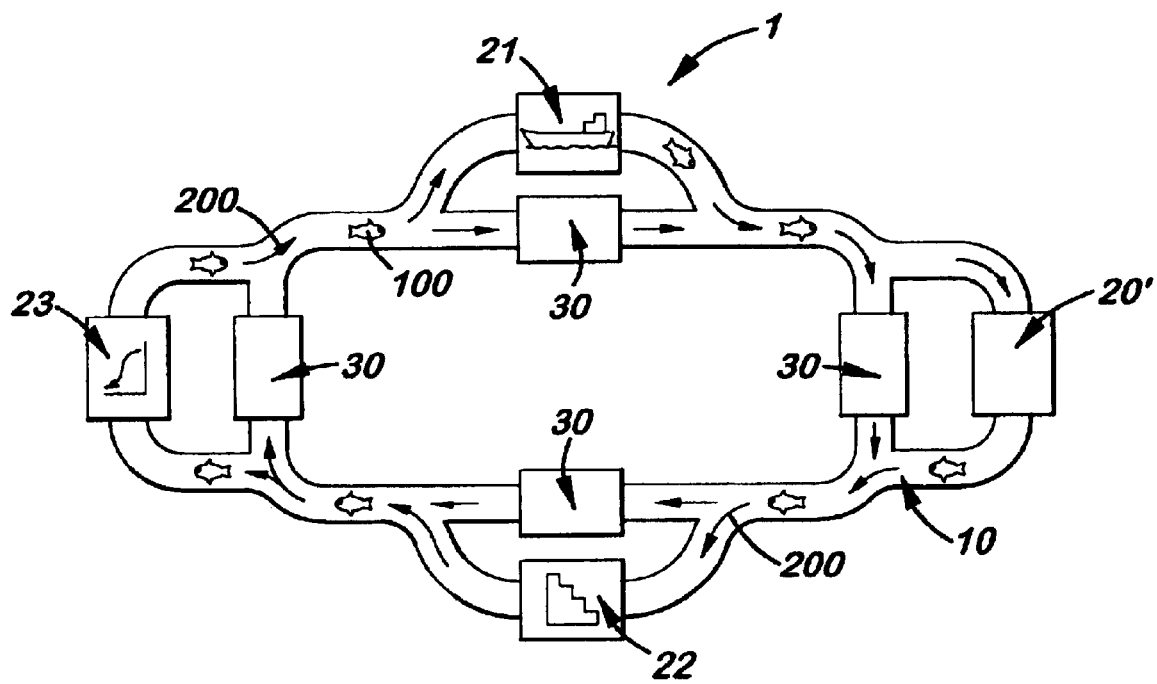
FIG. 3 is a schematic representation of this invention which includes potential or known bypass systems available for testing.

Referring now to FIG. 3, diagrammatic representations of known fish bypass systems to potentially test and evaluate include a barge bypass system 21, a fish ladder 22, a fish plume 23, and/or part or all of a fish pipeline system such as disclosed in my U.S. Pat. No. 5,161,913. Of course this invention may be effectively used to test and evaluate any other known or future developed fish handling or control systems, fish bypass systems, equipment and methods. As stated hereinabove, the incorporation of waterway barriers 30, such as dams, grates and screens, for example, in the test loop is also acceptable. Also, a sonic control system may be included as a test module, for testing the response of fish to various frequencies and amplitudes. For example, a sonic diverter system for fish has been developed by Sonalysts, Inc. of Connecticut, U.S.A., which creates a sound that drives fish away from the sound and toward a desired location.

Conduit 10 may be formed as a closed pipe, an open trough or a simulated stream bed. Its materials, dimensions, circumference, width and perimeter are not critical to this disclosure as long as they adequately accommodate the fish bypass system to be evaluated, the desired test parameters and the environmental conditions required for the fish and bypass system test.

Also, conduit 10 need not be in a closed loop. For example, referring to FIG. 4, an open loop bypass in a stream flow may be provided. There, a side channel 2 from, for example, a natural waterway 3, is provided. The side channel 2 may be further divided into a plurality of different testing channels 4. In each testing channel is a fish bypass test station 5, with monitoring means 6a and 6b, before (upstream) and after (downstream), respectively, for each bypass test station 5.

Figure 4:
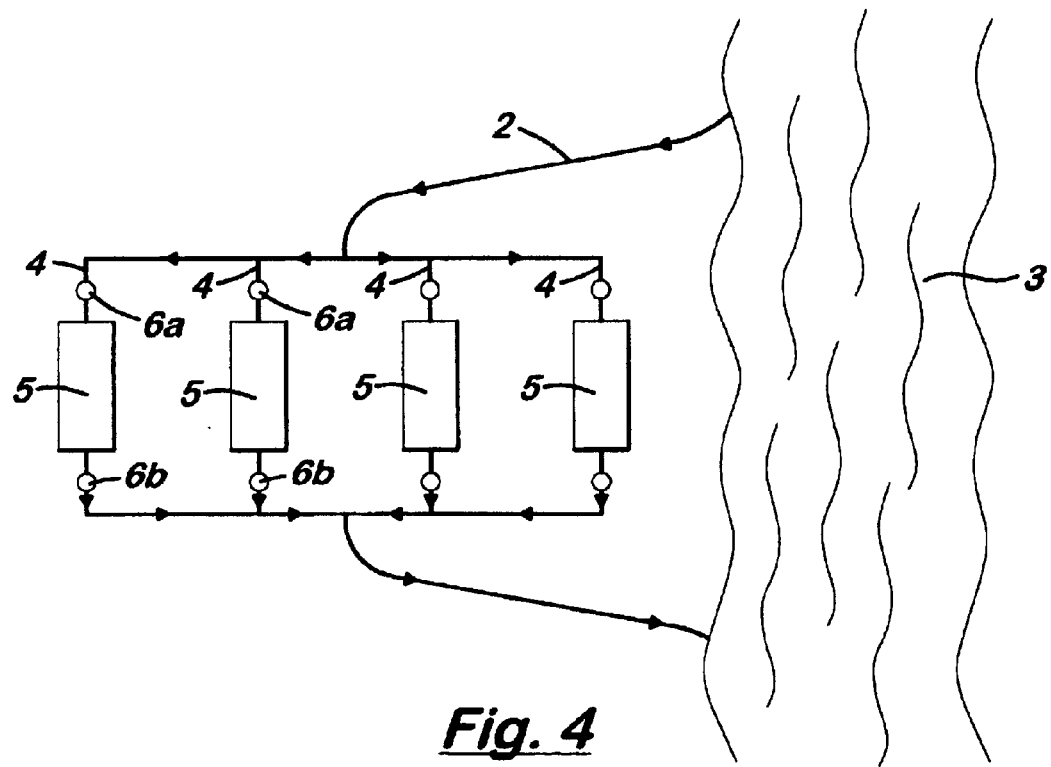
FIG. 4 is a schematic representation of this invention wherein the test circuit is a side channel of another waterway.

In the open loop test circuit depicted in FIG. 4 water flow may be provided by the grade from the upstream to the downstream ends of the circuit. Also, in this case, the means for introducing fish may simply be the open channels leading to the test station(s) 5. For the open loop system, the means for measuring the effectiveness will be similar to, if not the same as, those for the closed loop system described above, namely visual observation, counting and physical examination.

Although this invention has been described above with reference to particular means, materials and embodiments, it is to be understood that the invention is not limited to these disclosed particulars, but extends to all equivalents within the scope of the following claims.

I claim:

1. A fish test circuit for the evaluation of waterway barrier fish bypass systems comprising:
   a closed loop conduit having a plurality of different fish bypass testing stations in series,
   a system for providing water flow within said conduit,
   a system for introducing fish into said conduit, and
   a system for measuring the effectiveness of the different fish bypass systems under test.

2. A fish test circuit according to claim 1 wherein said system for measuring the effectiveness of the different fish bypass systems under test includes a system for determining the survival rate of the fish as they pass through each bypass system, said system for determining the survival rate including a system for physical examination of the fish.

3. A fish test circuit according to claim 1 further including a system for controlling the environmental conditions and quality of the water within said conduit.

4. A fish test circuit according to claim 1 wherein said conduit is comprised of a plurality of sections, each section including illumination of the section.

5. A fish test circuit according to claim 1 comprising means for viewing fish upstream and downstream of each different fish bypass testing station.

6. A fish test circuit as in claim 1, wherein said plurality of different fish bypass testing stations comprises a dam structure and comprises a bypass unit selected from the group consisting of: a barge bypass system, a fish ladder, a fish plume, and at least a portion of a fish pipeline.

7. A fish test circuit as in claim 1, wherein said plurality of different fish bypass testing stations comprises a grate structure and comprises a bypass unit selected from the group consisting of: a barge bypass system, a fish ladder, a fish plume, and at least a portion of a fish pipeline.

8. A fish test circuit as in claim 1, wherein said plurality of different fish bypass testing stations comprises a screen structure and comprises a bypass unit selected from the group consisting of: a barge bypass system, a fish ladder, a fish plume, and at least a portion of a fish pipeline.

9. A method of evaluating waterway barrier fish bypass systems comprising the steps of:
   providing a conduit having a plurality of different fish bypass test stations,
   inducing water flow within said conduit,
   introducing fish into said conduit, and
   measuring the effectiveness of each of the fish bypass systems under test by steps comprising physical examination of the fish.

10. A method of evaluating waterway barrier fish bypass systems according to claim 8 wherein measuring the effectiveness of the different bypass systems includes the step of determining the survival or mortality rate of the fish as they pass through each bypass system.

11. A method as in claim 9, wherein said plurality of different fish bypass test stations comprises a dam structure and comprises a bypass unit selected from the group consisting of: a barge bypass system, a fish ladder, a fish plume, and at least a portion of a fish pipeline.

12. A method as in claim 9, wherein said plurality of different fish bypass test stations comprises a grate structure and comprises a bypass unit selected from the group consisting of: a barge bypass system, a fish ladder, a fish plume, and at least a portion of a fish pipeline.

13. A method as in claim 9, wherein said plurality of different fish bypass test stations comprises a screen structure and comprises a bypass unit selected from the group consisting of: a barge bypass system, a fish ladder, a fish plume, and at least a portion of a fish pipeline.

14. A fish test circuit for the evaluation of waterway barrier fish bypass systems comprising:

- a conduit including a plurality of different fish bypass testing stations;
- water flowing through said conduit;
- a known quantity of fish in a known condition introduced into said water in said conduit;
- a first fish viewing station upstream of each of said fish bypass testing stations; and
- at least one second fish viewing station downstream of each of said fish bypass testing stations.

15. A fish test circuit for the evaluation of waterway barrier fish bypass systems according to claim 14 wherein said conduit is a closed loop.

16. A fish test circuit for the evaluation of waterway barrier fish bypass systems according to claim 14 wherein said conduit is a side-channel from another waterway.

17. A fish test circuit for the evaluation of waterway barrier fish bypass systems according to claim 14 with illumination in said conduit.

18. A fish test circuit as in claim 14, wherein said plurality of different fish bypass testing stations comprises a dam structure and comprises a bypass unit selected from the group consisting of: a barge bypass system, a fish ladder, a fish plume, and at least a portion of a fish pipeline.

19. A fish test circuit as in claim 14, wherein said plurality of different fish bypass testing stations comprises a grate structure and comprises a bypass unit selected from the group consisting of: a barge bypass system, a fish ladder, a fish plume, and at least a portion of a fish pipeline.

20. A fish test circuit as in claim 14, wherein said plurality of different fish bypass testing stations comprises a screen structure and comprises a bypass unit selected from the group consisting of: a barge bypass system, a fish ladder, a fish plume, and at least a portion of a fish pipeline.

\* \* \* \* \*